United States Patent [19]

Baer

[11] Patent Number: 4,846,693

[45] Date of Patent: Jul. 11, 1989

[54] VIDEO BASED INSTRUCTIONAL AND ENTERTAINMENT SYSTEM USING ANIMATED FIGURE

[75] Inventor: Ralph H. Baer, Manchester, N.H.

[73] Assignee: Smith Engineering, Culver City, Calif.

[21] Appl. No.: 278,562

[22] Filed: Dec. 1, 1988

Related U.S. Application Data

[63] Continuation of Ser. No. 1,952, Jan. 8, 1987.

[51] Int. Cl.$^4$ ................. G09B 50/60; G09F 19/08
[52] U.S. Cl. ........................... 434/308; 446/298; 446/301
[58] Field of Search ............ 434/256, 257, 308; 446/295, 297–303, 330

[56] References Cited

U.S. PATENT DOCUMENTS

| | | | |
|---|---|---|---|
| 4,149,716 | 4/1979 | Scudder | 273/1 E |
| 4,177,589 | 12/1979 | Villa | 364/410 |
| 4,341,385 | 6/1982 | Doyle et al. | 273/237 |
| 4,359,223 | 11/1982 | Baer et al. | 273/85 G |
| 4,360,345 | 11/1982 | Hon | 434/262 |
| 4,375,286 | 3/1983 | Seitz et al. | 273/121 A |
| 4,384,721 | 5/1983 | Dolansky | 273/237 |
| 4,398,720 | 8/1983 | Jones et al. | 273/238 |
| 4,445,187 | 4/1984 | Best | 364/521 |
| 4,490,810 | 12/1984 | Hon | 434/308 |
| 4,521,205 | 6/1985 | Spector | 434/308 |
| 4,569,026 | 2/1986 | Best | 364/521 |

FOREIGN PATENT DOCUMENTS

0036797  4/1981  European Pat. Off. ............ 446/229

OTHER PUBLICATIONS

Article Entitled "The Turtle".
HERO I robot article from Dec., 1982 Edition of Robotics Today Magazine.
Article from Toy & Hobby World Magazine re Nintendo Robot.
Article entitled "An Autonomous Computer-Controlled Vehicle", by L. Marce, M. Julliere and H. Place.

Primary Examiner—Theodore M. Blum
Assistant Examiner—Gregory C. Issing
Attorney, Agent, or Firm—Price, Gess & Ubell

[57] ABSTRACT

An animated figure, e.g. a doll, having the capability of moving its eyebrow, eyelids, eyes and mouth in conjunction with an audio reproducer, i.e. speaker, in its interior is electrically connected to a control box. The control box, which may be powered by household A.C. or by batteries, is connected to the audio and video outputs of a conventional videocassette recorder, (VCR). The VCR is connected to a conventional television set or television monitor. A videocassette recording having a video/audio story line recorded thereon, also contains control data in the video track for animating the dolls moveable parts, as well as routing selected portions of the audio track to the doll's speaker. A preferred video encoding scheme is utilized to embed the control data in the video signal by raising selected horizontal line periods to a new, white level. The illusion created to the human viewer is that of the doll having an animated conversation with characters on the television monitor. An interactive input device may also be connected to the control box. A human viewer can influence the actions and spoken words of the doll, as well as the action and language on the TV monitor, by manipulation of the interactive input device. The illusion created is that the human is now an active participant with the animated doll in the story unfolding on the television monitor. Various alternate system's configurations are presented.

19 Claims, 9 Drawing Sheets

VIDEO BASED INSTRUCTIONAL AND ENTERTAINMENT SYSTEM USING ANIMATED FIGURE

This is a continuation of application Ser. No. 001,952 filed on Jan. 8, 1987.

BACKGROUND OF THE INVENTION

1. Field of the Invention

The present invention relates generally to improvements in hand-held dolls or plush animals, and more particularly pertains to a new and improved combination of an animated doll or plush animal with recorded video program playback equipment.

2. Description of the Prior Art The animation of small hand-held dolls or plush animals has become a well-known implementation of electronic control and model animation technology. The resultant products offer a child lifelike companions in the form of talking dolls or teddy bears for example. Such products generally rely on one of two common methods to produce the sounds or spoken phrases. They utilize electronic voice syntheses or they reproduce the voice by means of an internal audiocassette player. The animation of these figures is controlled either by a resident microprocessor or discrete electronics located inside the animated figure. Or, the animation is controlled by control tones or data located on the audiotape.

The focusing of this animator technology on electronically controlled dolls, plush animals, robots and other "child oriented" products is resulting in a variety of such products which are finding considerable acceptance in the marketplace.

The object of these talking and gesturing animated figures is to entertain and instruct young children. The technique is storytelling by means of single word, or sentence long responses triggered by inputs, such as the absence of a child's voice, by push buttons, by position sensitive sensors located inside the animated figure, or by switches, and the like.

The present invention is a step forward that results in a difference of kind rather than degree. The present invention takes advantage of the nearly universal access to videocassette recorders and players by the general public. These devices are presently underutilized in the home merely as entertainment centers. The present invention comprises a combination of animated figures and videotaped programs containing both the sound and control signals required to drive the animated figure.

It is an object of the present invention to provide a combination of a video based source of entertainment and education with one or more animated figures, wherein the video source provides both the control for gestures of the animated figures and supplies the verbal expression for the animated figures.

Another object of the present invention is to extend the action taking place on the screen of the television set into the viewing room by creating a setting in which the child, animated figure and the characters on the screen interact in verbal and gestural interchanges controlled by the story line of the video presentation.

Another object of the present invention is to provide a means for utilizing ordinary videocassette or videodisc players and allowing the conversion of existing videocassette program material into a format utilizable by the system of the present invention.

It is yet another object of the present invention to extend this interaction between the child, the animated figure and the characters on the television screen by providing for hands-on interaction between the child, the animated figure and the action on the screen.

A further object of the present invention is to provide a system that allows the child to become a participant in the action between the animated figure and the characters on the screen by directing the story line or action through an input device.

According to the present invention, the foregoing objects and the general purpose of the invention are obtained as set forth in the summary of the invention.

SUMMARY OF THE INVENTION

A recording medium contains both video and audio signals arranged to present a story to the viewer of the reproduction on a display device such as the screen of an ordinary television set. The recording medium also contains data signals nested in the video or audio signals that control selection and/or routing of the stored audio signals for reproduction, as well as for other functions. A preferred video encoding scheme is utilized to embed the data signals in the video signal by raising selected horizontal line periods to a near-white level. A control mechanism connected to receive the video and audio signals stored on the recording medium decodes the data signals and generates appropriate control signals that select and/or route the recorded audio to selected reproduction sites, as well as animate the figure. An animated figure, a doll with moveable parts with a speaker inside, is connected to the control mechanism to receive the control signals for activating its moving parts in synchronism with reception of certain audio signals routed to its speaker. In certain embodiments of the present invention an input device, such as a keyboard operable by a human, is connected to the control mechanism. The input selections of the operator cause the control mechanism to change the routing of the recorded audio signals, as well as the animation control signals, to one of a number of predetermined patterns, in accordance with the operators keyboard choice, thereby allowing the operator to interact with the figure and screen, thus creating the illusion that the operator is a actor in the verbal and gestural interaction between the animated doll and the characters of the story unfolding on the display device.

BRIEF DESCRIPTION OF THE DRAWINGS

The exact nature of this invention, as well as other objects and advantages thereof, will be readily apparent upon consideration of the following specification in conjunction with the accompanying drawings in which like reference numerals designate like parts throughout the figures thereof and wherein.

DESCRIPTION OF THE PREFERRED EMBODIMENTS

Figure 1:
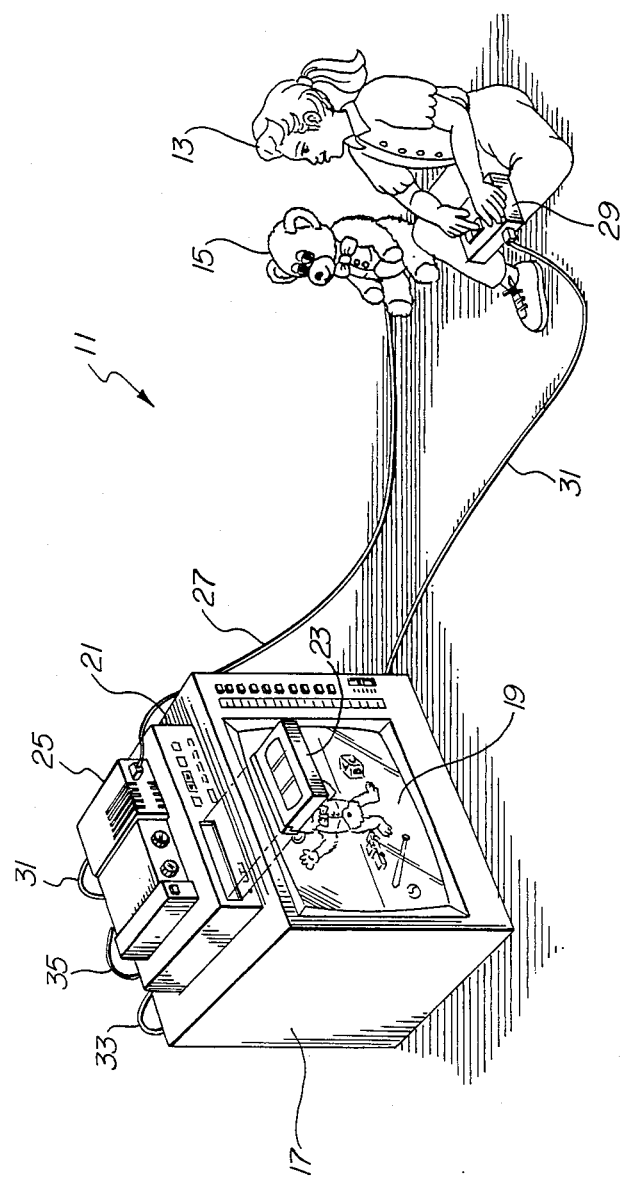
FIG. 1 is a pictorial representation of the major components in the system of the present invention.

FIG. 1 illustrates the basic components of a system 11, according to the present invention, as including an animated figure in the form of a bear 15 connected by a cable 27 to a control box 25. A television or a monitor device 17 having a display screen 19 is connected to a VCR recorder/player 21 by cable 33. The VCR 21 in turn has its audio and video output directed to control box 25 by way of cable 35. The VCR 21 receives a cassette tape cartridge 23, which has audio and video signals recorded thereon. These signals are supplied to the television set or monitor 17 for display on screen 19.

The volume control on the television or monitor 17 is turned down so that the audio portion of the program recorded on cassette 23 is not reproduced through the television speaker. Control box 25 receives the audio and video signals recorded on the cassette 23 over cable 35, causing the audio portion of the program to be reproduced by way of a speaker in control box 25. Control box 25 supplies the appropriate data or control signals and audio signals to the animated FIG. 15 by way of cable 27.

The animated FIG. 15 can be a stand-alone toy having battery power, as well as receiving control and power, over umbilical cable 27. The animated figure may be one of many toys presently being offered for preschool and early school children. Some of these animated bears, dolls and the like are designed to operate in a stand-alone mode by responding to audio input, or lack of it, as well as having position sensors located therein to trigger a verbal response such as "Hey, let's talk", "Yes", "For sure", "Hmm - That's a tough question", "Positively", "Better ask again later", "Let me see", for example. If placed face down, the position sensors could activate an audio response such as "Turn me over". Upon being turned over, the position sensors would activate the audio response "Your the greatest". If laid down on its back, the position sensors would activate the audio response, "I like to be picked up". A touch sensor under the left arm may activate the audio response of a simulated giggle. Lack of verbal input could activate the audio response "Let's talk". If there is no verbal input for at least twenty seconds, the bear closes its eyes to simulate sleep. The control and audio signals transmitted to the animated FIG. 15 over umbilical cable 27 activate the same motor and sound reproduction system of the figure utilized for its freestanding or stand-alone activity.

The additional dimension of hands-on interaction between child viewer 13, the animated FIG. 15 and the characters being displayed on screen 19 of the television is provided by an input control device 29, which is connected by cable 31 to a control box 25. This input device 29 is activated by the child viewer 13 observing the interaction between the animated FIG. 15 and the characters on the screen 19 in response to questions posed or evolving out of the context of the video presentation.

Without input control device 29 entertainment and education system 11 allows the animated FIG. 15 to engage in simulated conversation with characters or persons on the screen 19 of the television in such a way as to extend the action from the screen 19 into the room where the child observer 13 is located. This extension of the screen scenario into the viewing room by way of the animated FIG. 15 is both entertaining and subjectively useful in that it lends a lifelike appearance to the dialogue and other interaction, thereby adding to the young viewer's perception of the story line.

The foregoing interaction however, occurs only between the activity on the screen 19 of the television and the animated FIG. 15. The viewer 13 remains a relatively passive bystander who is entertained by watching this three-dimensional interplay between the characters on the screen and the animated figure sitting near the television set. The interaction of the viewer 13 with the story line is effectively limited to verbal and gestural responses to the story line when the latter specifically addresses the viewer and asks for a response. These are a desirable and useful objective.

In an enhanced version of the present invention, the input control device 29 provides the capability of allowing the viewer 13 to actually respond to questions or situations. For example, yes or no answers, or multiple choices of one of several answers can be communicated responsively by viewer 13 by pushing an appropriate key or button on input control 29. This input allows the viewer 13 to effect a change in the ongoing story line. Such change may consist, for example, of an appropriate response by the system which may cause either a character or other display on the screen 19, or the animated FIG. 15 to respond to the viewer's selection, either in the affirmative or negative. For example, an aural response might be "You are right", or "You are wrong", "This is a zebra, not a horse", et cetera.

Figure 2:
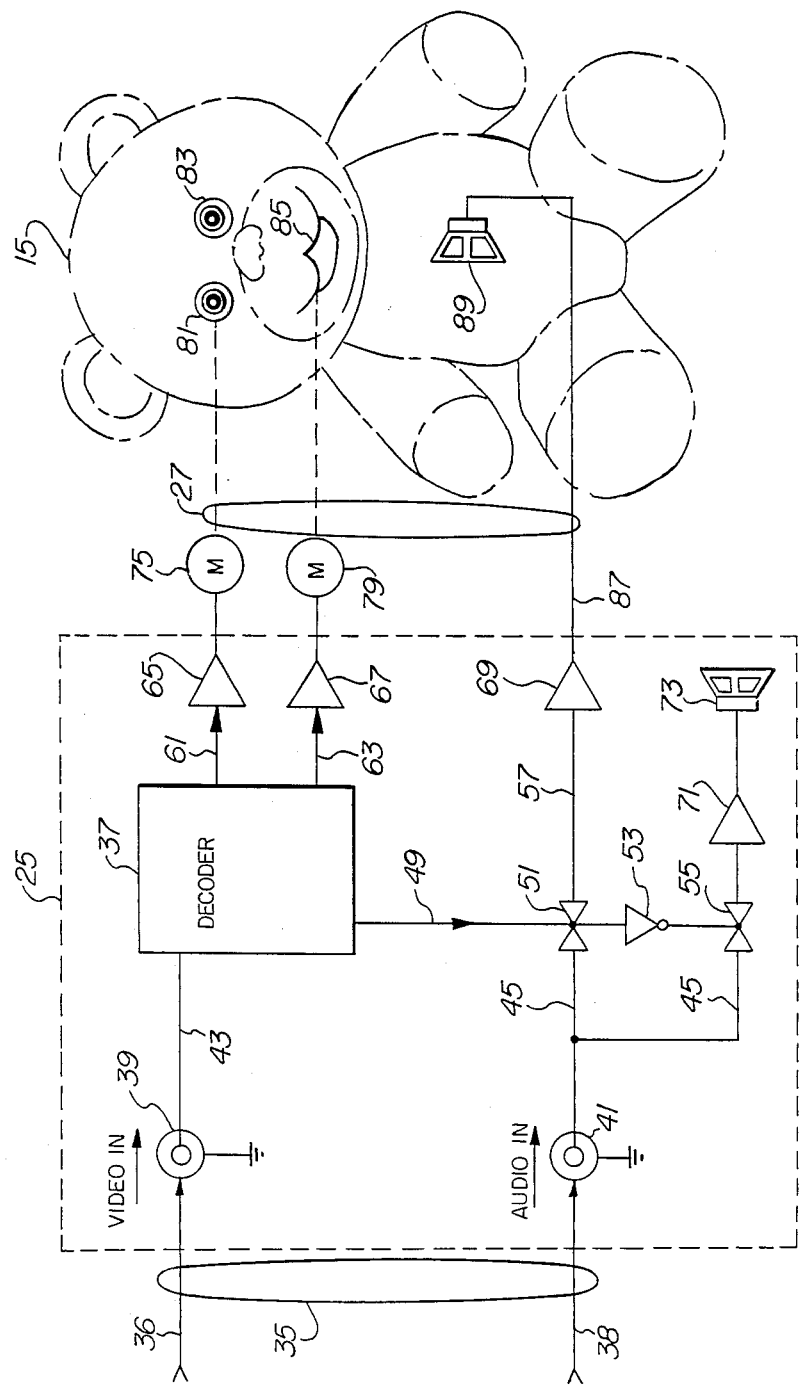
FIG. 2 is a block diagram and pictorial representation of the combination of the animated figure and the electronics of the present invention.

Referring now to FIG. 2, the relationship between the control box 25 and the animated FIG. 15 is illustrated. The control box 25 receives both the video and audio base band signals over cable 35 from a VCR. The video signal is provided to a video input plug 39 by line 36 in cable 35. The audio input signal is provided to an audio input plug 41 by line 38 in cable 35. The video signal is routed to a decoder 37. Decoder 37 essentially extracts from the video signal three control signals to generate an eye motion control signal on line 61, a jaw/mouth motion control signal on line 63 and a voice changeover signal on line 49. Exactly how this is accomplished will be explained in connection with subsequent figures.

When an eye motion control signal is present on line 61, it is amplified by amplifier 65, which supplies driving current to eye motor 75. The eye motor 75 is located within the animated FIG. 15 and is connected to the output of amplifier 65 by the umbilical cord 27, which connects the animated FIG. 15 to the control box 25. The eye motor 75 moves the eyes 81 and 83 of the animated FIG. 15, in response to a driving current from amplifier 65.

In a similar manner, whenever there is an output signal on line 63 of decoder 37, amplifier 67 drives motor 79. Motor 79 is located in the animated FIG. 15 close to the mouth area 85 of the figure. When the motor 79 is activated it produces a jaw, lip or mouth motion for the mouth area 85 to emulate speaking of the animated FIG. 15.

This eye and mouth motion by the animated FIG. 15 is emulative of eye and mouth motions that accompany speaking. Hence, loudspeaker 89 located within animated FIG. 15 must at the same time be reproducing the accompanying sound signals to complete the illusion that the animated FIG. 15 is talking. Only portions of the audio signal coming in on audio input plug 41 that are appropriate are transmitted to the speaker 89 of the animated FIG. 15.

Accordingly, transmission gate 51 blocks the inappropriate audio signals coming in on line 45 and passes only the appropriate audio signals. Transmission gate 51 is turned on by the output signal appearing on line 49 of decoder 37 whenever the output signal on line 49 goes high, transmission gate 51 is turned on. As a result, the audio signal is passed through gate 51 to line 57 where it is amplified by audio amplifier 69, which in turn drives speaker 89 by way of wires 87 in the umbilical cord 27 of the animated figure.

When the story line being presented on the television screen, as provided by the VCR cassette 23, shifts the action to the characters on the screen, it is desired to have the audio portion of the program emanate from a speaker near the screen. Speaker 73, which is mounted within control box 25, is located near the television set. As shown in FIG. 1, it is on top of the VCR 21. With the volume control of the television receiver turned towards zero or minimum, the voices of the screen characters will emanate from speaker 73 in control box 25. Whenever the screen characters are speaking the decoder output signal on line 49 of decoder 37 drops to a "low" or ground level, which disables the transmission gate 15. However, inverter 53 causes this "low" signal to become a "high" control signal level to transmission gate 55, closing transmission gate 55. Transmission gate 55 thereby passes the audio signal appearing on line 45 to audio power amplifier 71. This amplifier drives speaker 73 which is collocated within enclosure 25 so as to provide the audio portion for the action on the screen, thereby making it appear that the screen characters are talking.

Figure 3:
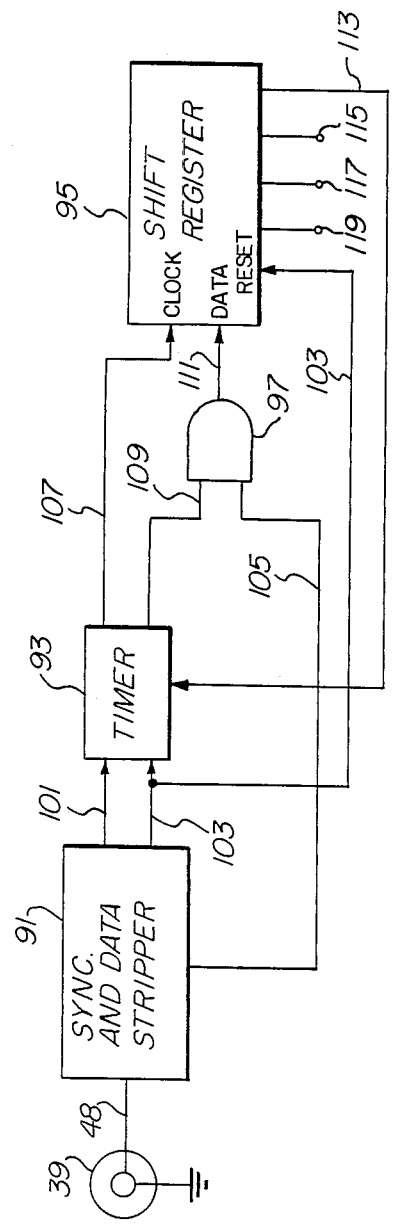
FIG. 3 is a block diagram, representing the preferred embodiment of an encoder used in the present invention.
Figure 4:
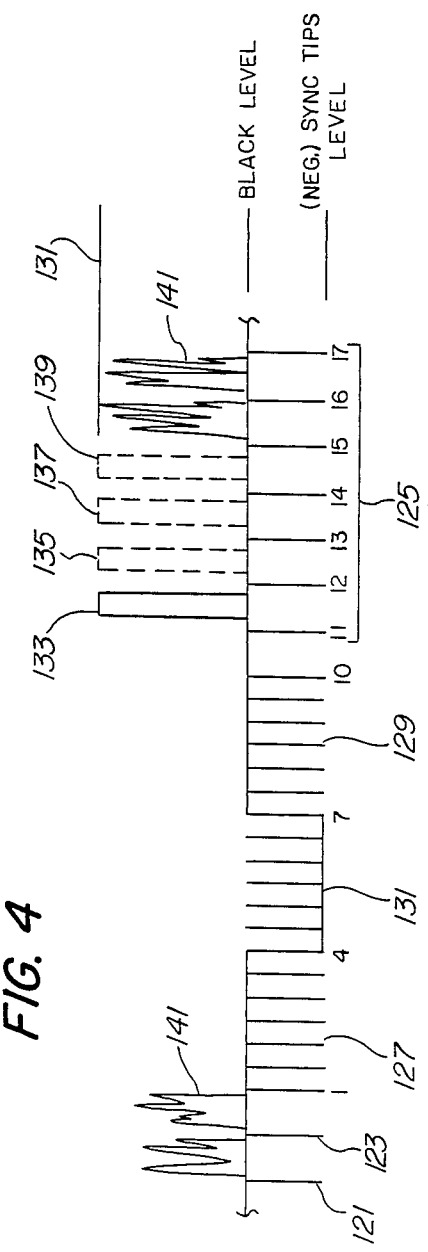
FIG. 4 is a wave form of a video signal showing how data signals are encoded thereon, according to the present invention.

The manner in which the decoder 37 accomplishes the extraction of contro signals from the base band video and synchronization signal is illustrated in FIGS. 3 and 4. Turning first to FIG. 4, there is shown a waveform illustrating a section of the video and sync signals starting two horizontal line intervals before the beginning of the vertical sync interval and ending at line 10. The horizontal sync pulses are depicted at 121, 123 and 125. The typical group of double frequency horizontal equalizing pulses are shown at 127 and 129. The vertical sync pulse with its 2H serrations, as required in United States NTSC specifications, is represented at 131.

Referring to FIG. 4, the first equalizing pulse occurs at the beginning of line 1 of 262.5 lines total per field. Therefore, the vertical sync pulses 131 occurs during lines 4, 5 and 6. The equalizing pulses following the vertical sync are lines 9, 10 and 11. For the purposes of explanation, FIG. 4 shows lines 12, 13, 14 and 15 as containing the coded signals required by the decoder 37 of the present invention for the control of eye, mouth and speaker changeover functions.

The horizontal sync pulse at the beginning of line 12 is followed by a one hundred percent white level 131 video signal. In practice, the first pulse and other control pulses following it on lines 13, 14 and 15 are about forty micro seconds wide in an NTSC system whose nominal active-video line period is approximately 55 microseconds. The pulse on line 12 is designated as pulse 133. This pulse is always present and represents a "start bit". Pulses 135, 137 and 139 may not be present at any one time and appear only when, and for as long as, they are needed to initiate a function, such as the moving of the eyes or the mouth, or audio crossover. After the period for the control signals is over at the end of line 15 (FIG. 4), then the video signals 141 begin and continue during the balance of the field time, or some 250 lines.

From the foregoing description, it can be seen that creating a videotape carrying control signals such as those shown in FIG. 4 can readily be accomplished by dubbing a videotape from a master containing no codes, simply by adding the required code in a postproduction step. This can be accomplished by simply inserting the forty microsecond wide control signals at the touch of a button by an operator working from a script. The encoded control pulses 135, 137 and 139 can be inserted on lines 12, 13 and 14 whenever, and as long as, the operator depresses buttons (not shown) corresponding to the desired function. The start pulse 133 on line 11 is always inserted automatically by the postproduction equipment (not shown).

From FIG. 2, we can see that the video and audio base band signal is applied to the video input track 39 and then to the decoder 37, which extracts three control signals from the video base band signal. FIG. 3 represents a block diagram of the decoder circuitry, which is a preferred embodiment of circuitry to extract the control signals contained in the video signal, as already described in conjunction with FIG. 4.

The video base band signal applied to the video input jack 39 is supplied to a sync signal and control data signal stripper 91. This circuitry functions to output the horizontal sync signal on line 101, the vertical sync signal on line 103 and the control/data signal on line 105 in a manner that is conventional and does not constitute a part of this invention.

Both the horizontal sync signal and the vertical sync signals are applied to a timer circuit 93, which outputs a clock signal on line 107, which occurs at the horizontal sync signal rate. The timer 93 also outputs a signal on line 109 which starts at the beginning of line 12 (FIG. 4) and ends at the end of line 15 (FIG. 4). The data signals on line 105 and the signal appearing on line 109 are applied to AND gate 97, which outputs on line 111 the control signals 133, 135, 137 and 139, if and when they are present in the base band video signal.

These outputs of the AND gate are applied to the data input terminal of a shift register 95, which is also driven by the clock signal on line 107, occurring at the horizontal sync rate. Accordingly, whenever a start bit 133 and subsequent signals 135, 137 and 139 arrive on line 111 they are clocked into shift register 195. The clocking action stops when the clock signal appearing on line 107 ceases. This occurs at the end of line 15

(FIG. 4), i.e. when the start bit, pulse 133, arrives at output 113 of shift register 95 and is used to stop the timer 93 via line 113.

This effectively "freezes" all data pulses, if any, currently on lines 119, 117 and 115. Thus the start bit and any control data signals encountered during these four horizontal sync periods are stored in the shift register 95. The four pulses stored in the shift register are available as outputs 113, 115, 117 and 119 until the shift register is reset. The shift register is reset via line 103 during every vertical sync pulse, i.e. at the end of each field. The shift register therefore is reset every sixtieth of a second. Hence, changes in the code can also take place as frequently as once per field.

The outputs 115, 117 and 119 of shift register 195 are typically integrated in an RC network to form a DC continuous wave signal capable of driving power amplifiers, such as amplifiers 65 and 67 of FIG. 2, or of switching transmission gates 51 and 55 of FIG. 2.

On the other hand, serial digital data may be obtained at a sixty bit per second rate by utilizing one of the output signals 119, 117 or 115 directly. Also, additional control data signals beyond the three shown in FIGS. 3 and 4 is entirely feasible. In such case, the timer 93 simply outputs a gating signal on line 109 that is long enough to encompass all of the control signals. This occurs automatically when the timer is stopped by the arrival of the start bit as already described. The shift register must have additional stages to accommodate the added data pulses.

In practice, the only major limitation on how many codes could be used is dictated by the number of horizontal lines that could carry such codes before the latter would show up at the top of a television screen. This, of course, is due to the fact that the present embodiment takes advantage of the overscan present in all typical consumer television sets. This overscan hides the code signals, which would otherwise be seen as blinking white line segments at the top of the screen.

Figure 5:
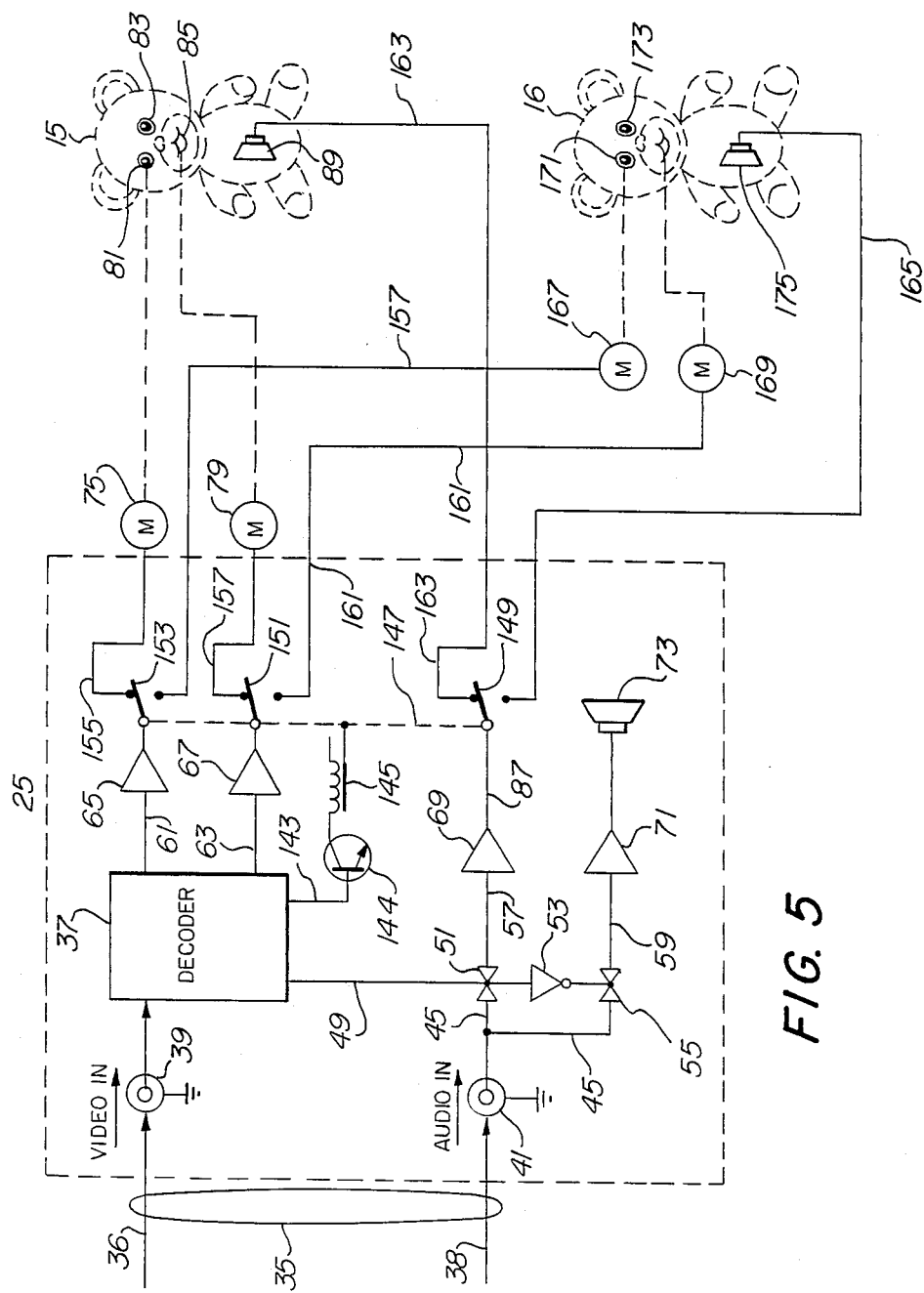
FIG. 5 is a block diagram, and pictorial representation of a decoder system according to the present invention, utilized to drive two animated figures.

FIG. 5 illustrates an alternate embodiment of the present invention, wherein two animated FIGS. 15 and 16, rather than just one, are "actors" in the story line unfolding on the television screen. The control box 25, as well as the decoder circuit 37, is modified to cause switching of the audio and control signals from the first animated FIG. 15 to the second animated FIG. 16 as preselected. Decoder circuit 37 generates an output on line 143 to transistor 144, which when forward biased energizes a coil 145 which coil acts to change the position of three pole double throw switch 147. Coil 145 and contacts 147 are typically a low power relay.

With the switch contacts located as shown in the figure, eye motor and jaw motor current, as well as sound audio signals, are delivered to animated FIG. 15. The output of amplifier 65 delivers the control signal through element 153, through contact 155 to eye motor 75, which activates the eyes 81 and 83 of the animated FIG. 15. Control signals on line 63 delivered by amplifier 67 through element 151, through contact 159 and then to motor 79 activate the mouth. The audio amplifier 69 delivers its signals over line 87 through element 149, through contact 163, to speaker 89 located within animated FIG. 15.

When the signal on line 143 goes high, causing transistor 144 to conduct, thereby energizing coil 145, the elements 149, 151 and 153 of the three pole double throw switch 147 move to their respective opposite contacts 165, 161 and 157 and will stay at this position as long as transistor 144 is conducting. In this position, the eye and mouth control signals are supplied over line 157 and 161 respectively, to motors 167 and 169, respectively, to operate the eyes and mout of the animated FIG. 16. Likewise, the audio signals are supplied over line 165 to speaker 175 in the animated FIG. 16.

By this structure, it is possible to generate scenarios involving dialogue between the two animated FIGS. 15 and 16 and between each of the figures and the screen character or characters on the television. This particular embodiment of the present invention further extends the degree to which the action of the program or story line can be physically extended into the living room of the viewer. In fact, the result is a conversational environment with interaction taking place between the screen character or characters and the two animated FIGS. 15 and 16, as well as the participating child.

It is contemplated that the two animated FIGS. 15 and 16 could be very different in appearance from one another and that they could be endowed with different voices and serve different purposes. For example, in a Sherlock Holmes scenario, one of the dolls could represent Mr. Holmes and the other doll could be assigned the role of Dr. Watson. The screen characters of such a story line would depict particular characters in the detective story, such as the murder victim, the police inspector, and the like.

To involve the viewer intimately in the scenarios, good scripting for the system with the present invention should provide many occasions during which the screen and doll characters address rhetorical questions to the child and then carry on by affirming assumed positive or negative responses. By doing this successfully, the viewing child will be drawn into thinking about the scenarios rather than watching them passively. Optimally, the child will also respond verbally whenever asked or otherwise motivated.

Figure 6:
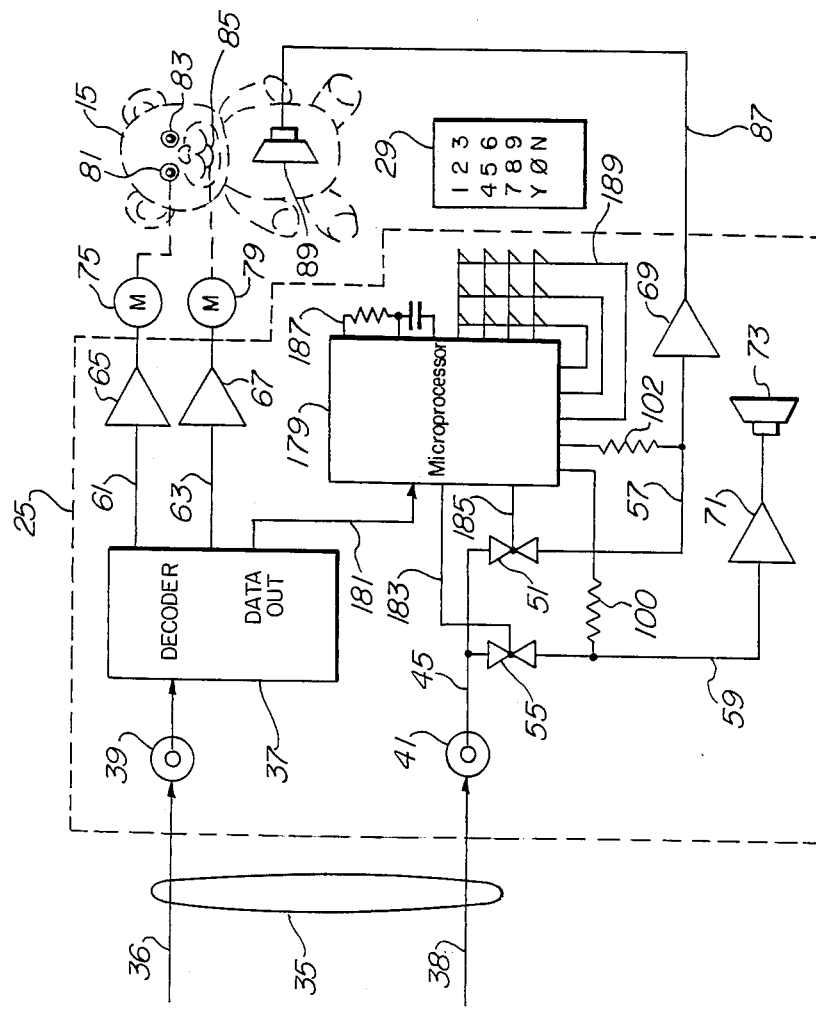
FIG. 6 is a block diagram and pictorial illustration of a system, wherein the child viewer may enter commands to change the action and verbal sequence of the story line.

The preferred embodiment of FIG. 6 takes the present invention a step further to ensure that the child becomes a participant in the action by providing the child a hands-on input mechanism 29, which will allow the child viewer to affect the ongoing program or story line.

As in the previously described embodiments, base band video and audio signals are provided from a VCR to video input plug 39 and audio input plug 41. From there, the video signals are supplied to the decoder 37. The decoder 37 extracts the data signals in the manner described previously, typically from five successive lines of each video frame. Whenever the eyeballs 81 and 83 of the animated FIG. 15 need to be moved, the decoder 37 generates a signal on line 61, which is amplified by amplifer 65 to provide a drive signal to motor 75. When the decoder 37 receives a signal corresponding to the jaw channel, then a signal on line 63 is provided to amplifier 67 which drives motor 79.

Decoder 37 delivers a decoded bit stream of data via line 181 to an input terminal of microprocessor 179, which functions as a programmable sound control device in control box 25. This microprocessor may be a common single-chip, 4 bit device such as a Texas Instrument TMS-1000, which contains integral RAM, ROM, ALU and interface circuits. Such microprocessors operate typically at a clock rate determined by the RC components of the RC network 187 or at a rate determined by another frequency determining device such as a crystal, or the like. A keyboard 189 is interconnected to input and output lines of the microprocessor in standard fashion. A typical 12 contact keyboard is illustrated with a layout of the keys being represented by unit 29.

In response to a particular digital bit stream received by the microprocessor 179, the latter develops a control signal on line 185 to turn on bilateral switch 51. Bilateral switch 51 then becomes conductive and allows the audio signal on line 45 to pass to audio amplifier 69 on line 57 and from there to drive speaker 89 within the animated FIG. 15 over line 87. In response to a different microprocessor 179 generates a control signal on line 183 which turns on bilateral switch 55. When switch 55 is enabled, it passes audio signals on line 45 by way of line 59 to audio amplifier 71 to drive speaker 73, which is located in the control unit 25, placed near or on the television set. This speaker 73, therefore effectively projects the sound attributable to the action appearing on the TV screen.

Microprocessor 179 has complete control of the audio channel for driving speaker 89 that simulates speech for the animated FIG. 15 and the audio channel for speaker 73 that simulates the speech of the characters on the screen. This capability enables the system to provide audio branching by muting and unmuting short sequential sound segments coming from the VCR audio track.

Microprocessor 179 is also capable of generating the signals required to produce synthesized voice from animated FIG. 15. The microprocessor 179 generates the appropriate control signals to activate a separate voice synthesizer (not shown) well-known in the art, which in turn drives speakers 89. Or, the microprocessor may perform the voice synthesis function itself. By utilizing voice synthesis for simulating speech by the animated FIG. 15, no time lag or miscue situations arise, thereby creating a more true-to-life sequence in the response.

Assume that the child viewer and the animated figure are involved in a question and answer scenario and that the viewer, having in his hands the input device 29, which is illustrated as a push button keyboard, pushes the "No" button in response to a particular question posed to him by either the animated FIG. 15 or by the character on the screen. The processor will receive this signal and unmute the appropriate section of audio and mute the inappropriate one in order to provide for example the audio response "Yes, you are correct" or "No, you are wrong", which are, of course, sequentially delivered by the audio track of the VCR. In addition, if desired, the microprocessor can cause synthetic sounds such as music or sound effects to be generated during the period the sound is muted, so as to prevent a period of silence. These sounds are supplied to amplifiers 69 and 71 via isolating resistors 100 and 102, respectively.

The microprocessor 179 can be programmed in a manner that is well-known to those of skill in the art so as to cause such an interaction. A flow diagram illustrating an interaction of this type is shown in FIG. 10.

At 205 the video base band signal is received by the decoder from the VCR. The decoder acts to strip the data from the base band VCR signal and generates control signals at 207. At 209, the decoder switches the audio to the speaker in the animated figure, as well as supplying the jaw activation commands to the figure, causing at 213 to simulate the figure's asking a question at the same time the VCR television screen displays the required subject matter 217. The child, in response at 221, selects one of the multiple choices and pushes a corresponding key. The child's response is provided to the microprocessor, which determines whether the answer is correct at 225. The microprocessor makes this determination based on internal ROM criteria or on data received from the VCR via line 181.

If the answer is not correct, that determination at 227 activates a synthesized negative voice sequence signal at 229, causing the figure to speak at 239, for example, "No, you're wrong". If the answer is correct, then a signal 231 is generated, activating a synthesized affirmative voice sequence signal at 233, causing the figure to effectively speak at 237 "Yes, you are right". After this action has occurred, the story line continues with additional data being received by the decoder from the VCR.

Figure 10:
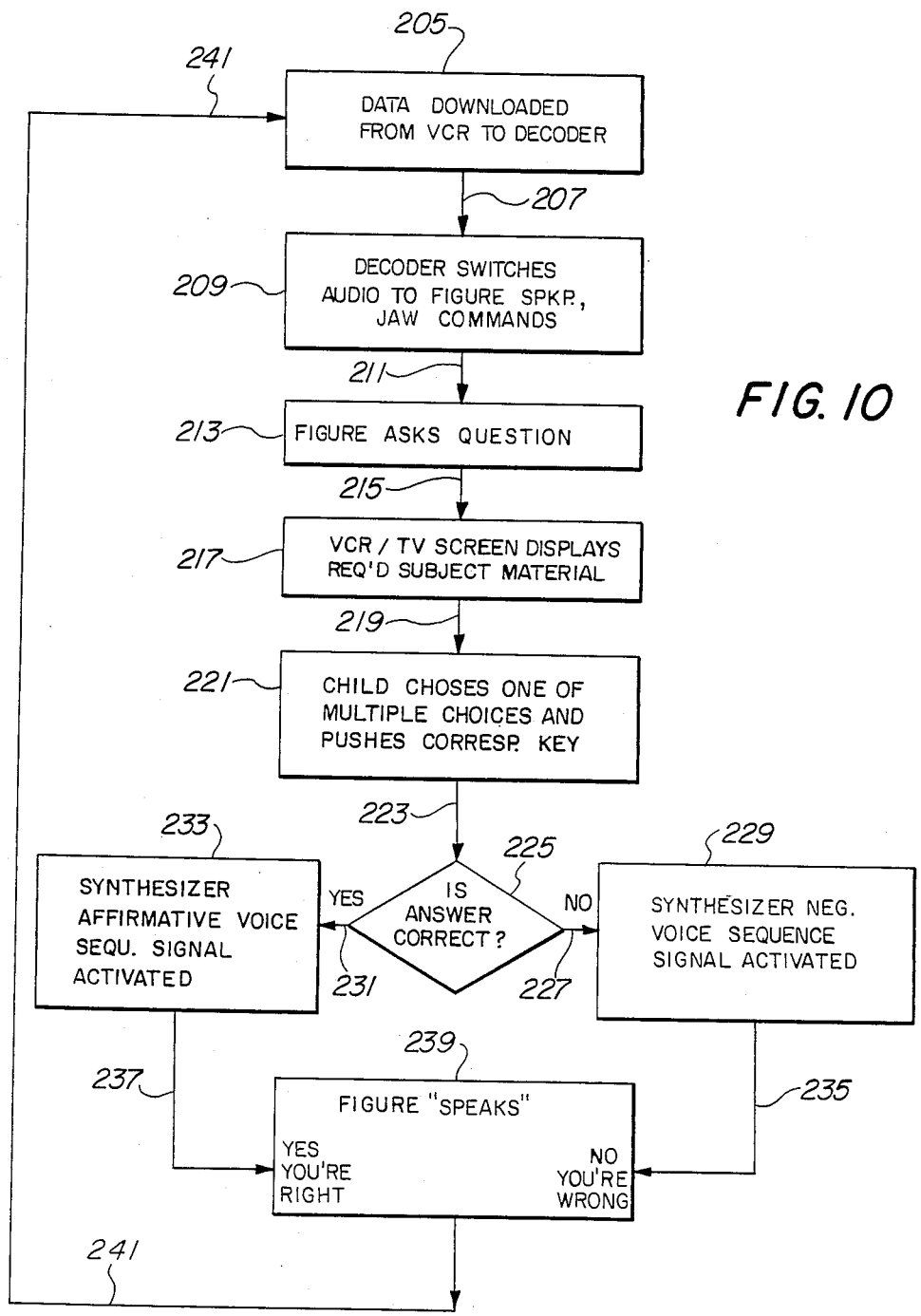
FIG. 10 is a flow chart, illustrating the program flow of the microprocessor based system of the present invention.

Alternatively, at step 225 of FIG. 10, the microprocessor rather than activating a synthesizer to generate a response, directs the branching of an appropriate response from the recorded medium, such as the VCR audio track as described above, by unmuting the appropriate transmission switch (as shown in FIG. 6) to permit the appropriate sound segment, step 231 or 237, to be delivered to either of the two speakers again under microprocessor control. Note that unlike the embodiment using a voice synthesizer, use of prerecorded audio tracks on the VCR tape allows a limitless variety of voices, music, sound effects and the like to be provided at essentially no cost to the system, considerably enhancing the potential for interesting interaction.

When two channels of audio are available, as is the case in higher quality VHS and BETA machines having stereo capabilities, as well as in three-quarter inch video tape recorders, it can readily be seen that considerably more flexible voice branching becomes available and managable under microprocessor control.

Figure 7:
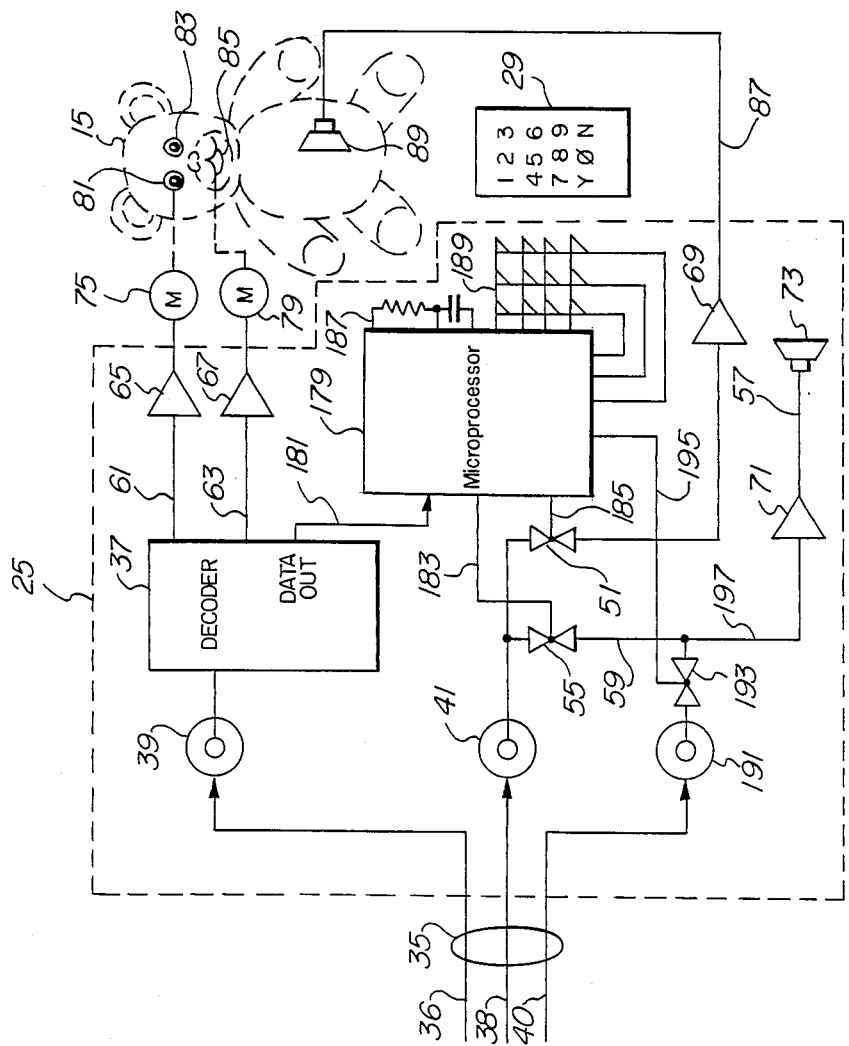
FIG. 7 is a block diagram and pictorial illustration of another system, wherein the child viewer may enter commands into the system.

Referring to FIG. 7, a preferred embodiment of the present invention utilizing two audio channels is illustrated. The audio input jack 41 receives a left channel audio track 38 while the audio input jack 191 receives the right channel input track 40. An additional transmission gate is controlled by the microprocessor 179 over control line 195. Thus, it is possible to play audio from either the right track or the left track of the VCR by activating control line 185 or 195, respectively. This makes it possible to more quickly switch to the proper verbal response required by a user's reply to a question, a user's reply which he keyed in by input device 29 in response to a question.

Figure 8:
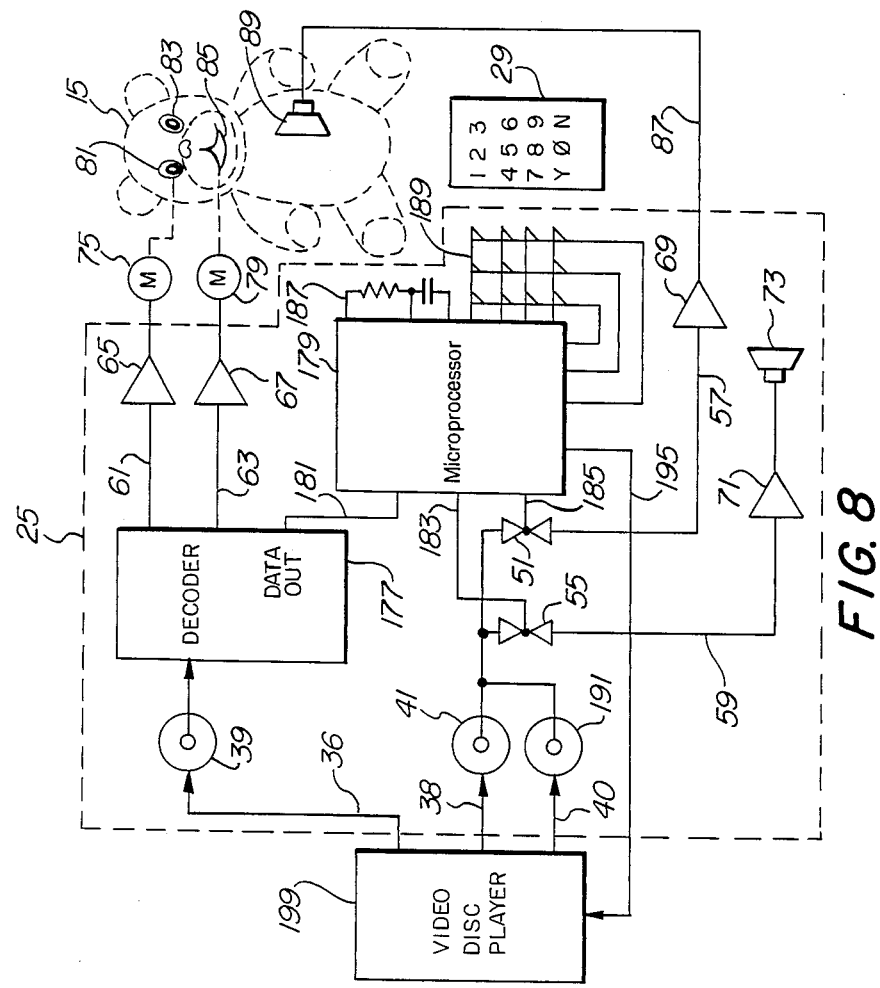
FIG. 8 is a block diagram and pictorial representation of another embodiment of the system, wherein the child viewer may enter commands into the system.

Considerably greater flexibility for an interactive system, according to the present invention, can be obtained when a video disc player is utilized in place of a VCR as described in the previous embodiments. FIG. 8 illustrates such a system arrangement, a video disc player 199 delivers video base band signals over line 36 to video input jack 39 and two audio channels 38 and 40 to audio input jacks 41 and 191. The video disc player 199 is controlled by microcomputer sound control unit 179 by way of multi-wire cable 195. This interface connection allows the microprocessor to control the starting, stopping, frame searching, playing, freeze frame selection, and other functions typically available in a standard videodisc player. By this arrangement, not only is audio branching efficiently implemented, but, in addition, the well-known methods of visual branching can be used to further enhance the capabilities of the system according to the present invention.

Figure 9:
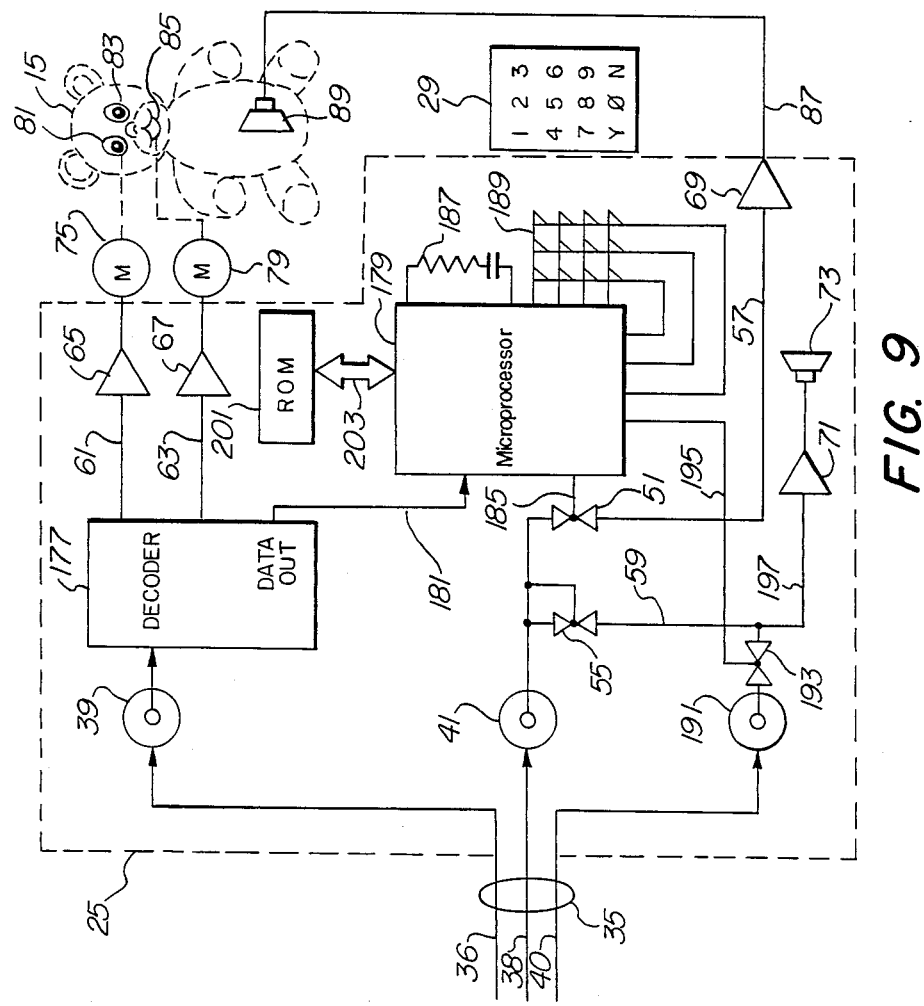
FIG. 9 is a block diagram and pictorial representation of another embodiment of the system, wherein the child viewer may enter commands into the system.

Referring now to FIG. 9, an alternative embodiment of the system invention is shown with the addition of a read-only memory (ROM) 201, which is externally attachable to a suitable microprocessor 179 by means of a plug-in cartridge or cassette and which interfaces with the microprocessor 179 by means of a two-way bus 203. The addition of a user attachable read-only cartridge is well-known in the personal computer and video game art and serves the same purpose in the system of the present invention as it does in those situations. Such a read-only memory cartridge may be included in the purchase of a videocassette or videodisc which contains the video and audio portions of a interactive program, along with the digital control data nested in the video base band signals which are needed to update the microprocessor.

It is to be noted that the present invention makes it possible to provide an interactive learning and entertainment environment unlike any prior system of its kind in that it allows the articulated figure, which may be a doll, a plush animal or a robot, et cetera, to act as a friendly tutor that communicates with the child or adult participant via its voice and gestures and through the aid of the viewing screen which effectively may become the blackboard, showing, for example, the graphics needed for the interactive process of learning or playing games. Thus, the typical classroom environment is re-creatable in the home. The "teacher" communicates new information which is displayed on the blackboard in a suitable form. The keyboard allows the student to show his degree of understanding. At all times, a microprocessor using data embedded in the videotape or videodisc storage sources, controls the passing of audible and visible presentation in judgment of the student's responses.

What is claimed is:

1. A video based instructional and entertainment system, comprising:
   a picture and sound presentation provided by a video and audio signal source containing digital control data embedded in said video signal, where said video signal displays at least one animated figure on the screen of a television receiver;
   at least one animated figure having at least one articulated component capable of motion where said motion is related to said control data;
   a first loudspeaker located internal to said animated figure where said loudspeaker reroduces at least a portion of said sound presentation and where said portion is selected by one of said digital control signals;
   a second loudspeaker internal to said system where said loudspeaker reproduces that portion of said sound presentation not delivered by said first loudspeaker;
   whereby said system allows real-time interaction between said animated screen figure and associated sound presentation as delivered by said television set, and said animated figure, where said interaction effectively extends said screen presentation into the physical space occupied by said animated figure.

2. The system of claim 1, wherein said video and sound signal source is VCR.

3. The system of claim 1, wherein said video and sound signal source is videodisc player.

4. The system of claim 1, wherein said embedded control signals are extracted from said video signal by a decoder.

5. The decoder of claim 4, wherein said extracted control signals are used to provide animation for at least one said component of said animated figure.

6. The decoder of claim 4, wherein said extracted control signals are used to effect said reproduction of sound selectively from either said animated figure or from said second speaker associated with said screen presentations.

7. The system of claim 1, in which at least one said control signal is provided so that its presence effects the transfer of other said control signals to a second animated figure having said controllable components and loudspeaker.

8. The system of claim 1, wherein said articulated component is the mouth of the animated figure.

9. The system of claim 1, wherein said articulated component is a facial feature of the animated figure.

10. The system of claim 1, wherein said articulated component is a body part of said animated figure.

11. An interactive video-based instructional and entertainment system, comprising:
    a picture and sound presentation provided by a video and audio signal source containing digital control data embedded in said video signal;
    a television set capable of displaying said picture presentation;
    a microprocessor controller receiving said embedded data;
    a manually actuable keyboard connected to said microprocessor;
    at least one animated figure having at least one articulated component capable of motion and where said motion is related to said control data;
    a first loudspeaker located internal to said animated figure, where said loudspeaker reproduces at least a portion of said sound presentation and where said portion is selected by said microprocessor in response to said digital control data and to entries to said manually actuable keyboard by a human participant;
    a second loudspeaker located intenal to said system, where said second loudspeaker reproduces said portion of the sound presentation not delivered by said first loudspeaker;
    whereby said system allows real-time interaction between said animated figure and at least one said human participant using said keyboard to respond to said video and sound presentation and to said loudspeaker reproductions; and where said real-time interaction results from selective playback of said portions of said sound source.

12. The system of claim 11, wherein said video and audio signal source is a video tape cassette player.

13. The system of claim 11, wherein said video and audio signal source is a videodisc player.

14. The system of claim 11, wherein said video and audio signal source is a Compact-Disc-Interactive player.

15. The system of claim 11, wherein said articulated component of said animated figure is the mouth of said figure.

16. The system of claim 11, wherein said articulated component is a facial feature of said animated figure.

17. The system of claim 11, wherein said animated component is a limb of said animated figure.

18. The system of claim 11, wherein said animated component of said figure is a body part.

19. The system of claim 11, wherein said microprocessor scores responses by the human participant.

* * * * *